United States Patent [19]

McClintock et al.

[11] Patent Number: 5,492,389
[45] Date of Patent: Feb. 20, 1996

[54] STOWABLE SEAT

[75] Inventors: Brian W. McClintock, Bloomfield Hills, Mich.; Michael D. Moffa, Glenview, Ill.

[73] Assignee: Freedman Seating Company, Chicago, Ill.

[21] Appl. No.: 216,930

[22] Filed: Mar. 23, 1994

[51] Int. Cl.$^6$ .................................................. B60N 2/32
[52] U.S. Cl. ........................................ 297/14; 297/378.14
[58] Field of Search ....................... 297/378.14, 378.12, 297/378.1, 14, 325, 326, 463.1; 248/293, 286; 296/65.1

[56] References Cited

U.S. PATENT DOCUMENTS

| | | | |
|---|---|---|---|
| 2,565,666 | 8/1951 | Schaefer | 297/326 X |
| 2,797,732 | 7/1957 | Thomas | 297/326 X |
| 3,594,037 | 7/1971 | Sherman | 297/14 |
| 4,206,946 | 6/1980 | Maertens | 297/378.14 |
| 4,723,493 | 2/1988 | Siani et al. | 297/14 X |
| 4,955,973 | 9/1990 | Provencher | 296/65.1 |

Primary Examiner—Milton Nelson, Jr.
Attorney, Agent, or Firm—Irwin C. Alter

[57] ABSTRACT

A stowable seat for mounting to a support member of a vehicle wherein a space may be selectively provided for positioning a wheelchair article adjacent to the stowed seat which includes a frame attached to the support member, a cantilevered seatbase and a seatback. The cantilevered seatbase has a free end, a pivotable end rotatably associated with the frame for providing the seatbase with a range of motion extending from a horizontally deployed position to a vertically stowed position, a diagonal support truss supporting the seatbase in the deployed position with a movable end of the support truss sliding within a runner track and a fixed end journalled with said frame. The seatback is rotatably associated with the seatbase and has a range of motion extending from an unfolded position to a folded position where the range of motion of the seatback is perpendicular to the range of motion of the seatbase where the seatback in the unfolded position is adapted to be at a predetermined angle with respect to the seatbase in said deployed position to provide seating and the seatback in the folded position is adapted to fold flat against the seatbase for stowing to provide the space for the wheelchair.

19 Claims, 3 Drawing Sheets

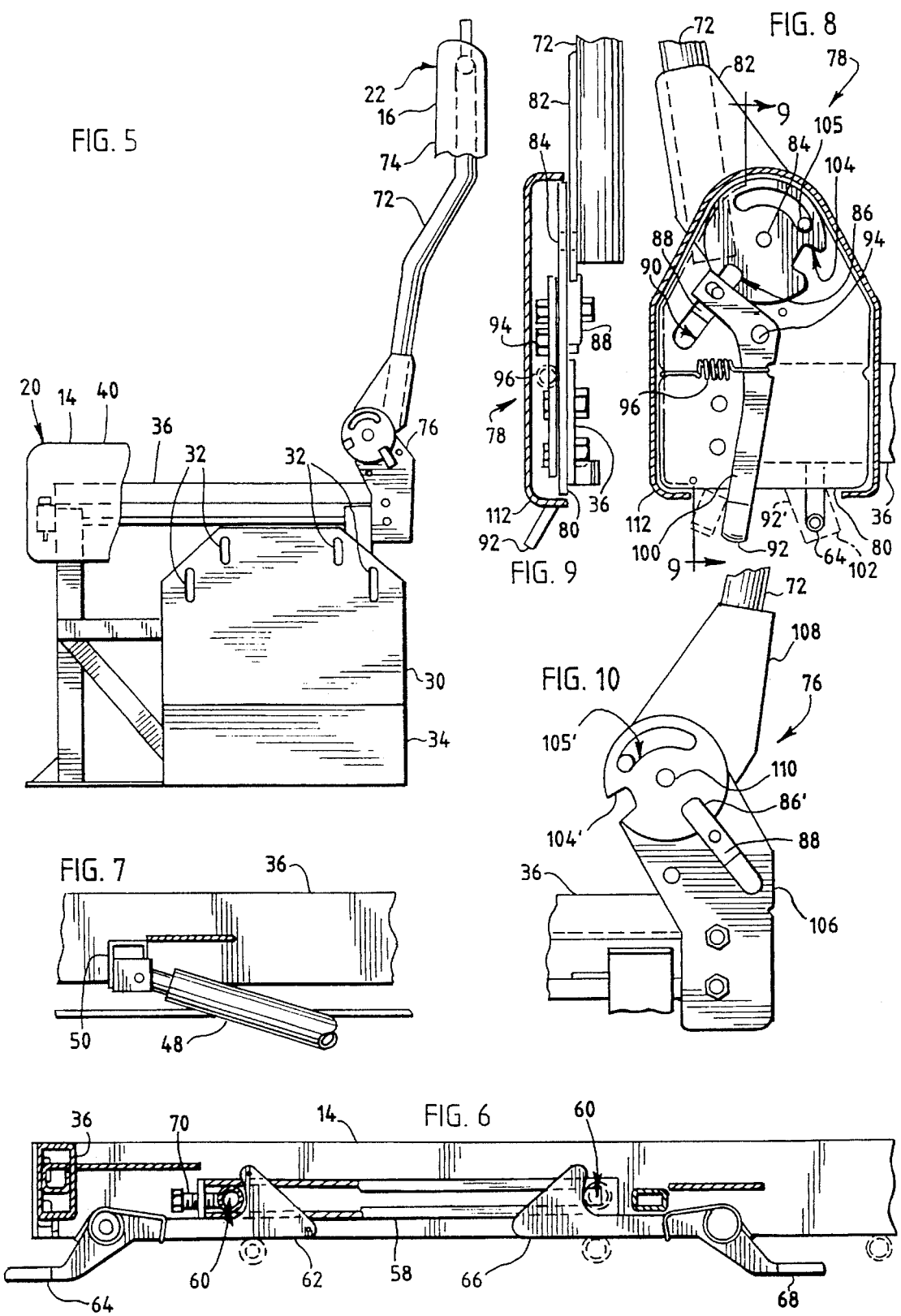

STOWABLE SEAT

BACKGROUND OF INVENTION

This invention relates generally to an improved fold away seat for use in a vehicle in order to provide a space for a wheelchair or for storage of various articles. The invention employs a cantilevered seatbase which pivots about one end from a horizontally deployed position to a vertically stowed position where a diagonal truss supports the seatbase when in the horizontally deployed position to a vertically stowed position where a diagonal truss supports the seatbase when in the horizontally deployed position. The seatbase is provided with a seatback which has a lockable unfolded position as well as lockable folded position flat against the seatbase where the range of motion of the seatback is perpendicular to the range of motion of the seatbase. The fold away seat is stowed by folding the seatback flat against the seatbase, unlocking the seatbase from its horizontally deployed position and raising the seatbase to its vertically stowed position where it is locked in place. The wheelchair or other article may be placed in the space vacated by the stowed seat.

At the present, the seats known are those which include a seatbase which has a support leg extending from the aisle end of the seatbase. Typically the aisle leg is fastened to the floor when the seat is down or tucked away when the seat is stowed away. While the known fold away seats having a support leg can be folded up to provide a space for a user or for storage, this does not disclose, teach or suggest a cantilevered seat which avoids the attendant difficulties arising from the use of the aisle leg on the seatbase which may interfere with an operator and requires additional steps for stowing.

SUMMARY AND OBJECTS OF THE INVENTION

Accordingly, it is an object of the present invention to provide a stowable seat for mounting to a support member of a vehicle wherein a space may be selectively provided for positioning a wheelchair or article adjacent to the stowed seat which includes a frame or wallmount, a seatbase and a seatback. Further, it is an object to provide a stowable seat which is readily mounted in place and avoids the use of protruding legs which may interfere with an operator.

Accordingly, the frame attaches to the support member and the cantilevered seatbase has a free end and a pivotable end rotatably associated with the frame to provide the seatbase with a range of motion extending from a horizontally deployed position to a vertically stowed position. The seatbase also has a diagonal support truss supporting the seatbase in the deployed position which has a movable end sliding within a runner track and a fixed end journalled with the frame, as well as a lock mechanism near the free end to restrain the movable end of the truss to maintain the seatbase in the deployed position.

The seatback is rotatably associated with the seatbase and has a range of motion extending from an unfolded position to a folded position. The range of motion of the seatback is perpendicular to the range of motion of the seatbase. The seatback in the folded position is adapted to be at a predetermined angle with respect to the seatbase in said deployed position to provide seating and the seatback in the folded position is adapted to fold flat against the seatbase for stowing to provide the space for the wheelchair.

BRIEF DESCRIPTION OF THE DRAWINGS

In order to satisfy the objects of the invention discussed herein, a stowable seat for mounting to a support member of a vehicle is provided as illustrated by the accompanying drawings wherein:

FIG. 5 is a side elevational view partially removed, illustrating the seatback in the unfolded position, and a pivot assembly which connects the seatback to the seatbase;

FIG. 6 is a front sectional view of the seatbase illustrating a runner track and a pair of locking mechanisms as viewed from line 6—6 of FIG. 3;

FIG. 7 is a front view, in partial section, of a gas charged cylinder journaled to the seatbase as viewed from line 7—7 of FIG. 3;

FIG. 8 is a side elevational view, in partial section, illustrating a dump mechanism on an aisle side of the seatbase as viewed from line 8—8 of FIG. 4;

FIG. 9 is a transverse sectional view of the dump mechanism of FIG. 8, taken along line 9—9 of FIG. 8;

FIG. 10 is a side elevational view, in partial section, of the pivot assembly on a frame side of the seatbase as viewed in the direction of arrow 10 of FIG. 4.

DESCRIPTION OF THE PREFERRED EMBODIMENTS

Figure 1:
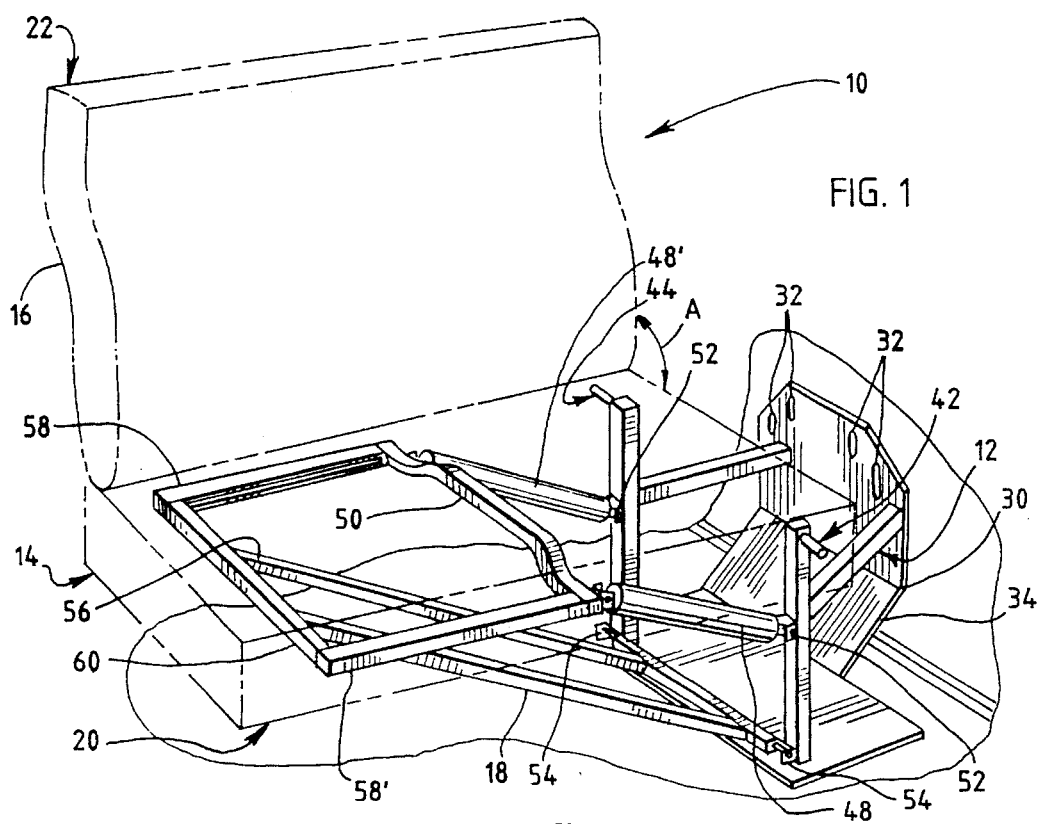
FIG. 1 is a pictorial view of the stowable seat illustrating the seatbase in a horizontally deployed position and the seatback in an unfolded position in phantom outline.
Figure 2:
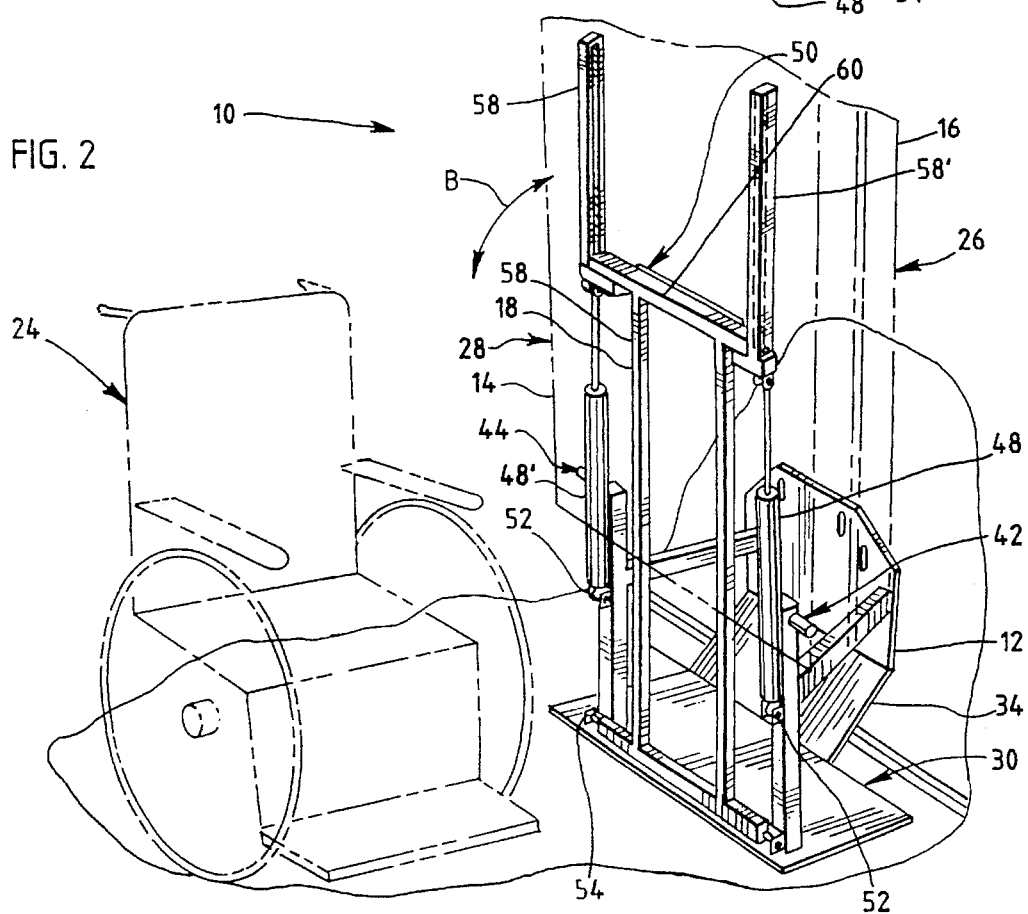
FIG. 2 is a pictorial view of the stowable seat illustrating the seatback in a folded position and the seatbase in a vertically stowed position where a wheelchair is illustrated in phantom outline in the space vacated by the stowable seat.

Referring to FIGS. 1 and 2, the stowable seat of the invention generally is designated by the reference numeral 10. The stowable seat 10 includes a wallmount or frame 12, a seatbase 14, a seatback 16 and a diagonal truss 18.

Briefly, in operation, the stowable seat 10 is typically utilized with the seatbase 14 in a horizontal deployed position 20 and the seatback 16 is in an unfolded position 22. The seatback 16 has a range of motion as indicated by arrow A perpendicular to a range of motion of seatbase 14 as indicated by arrow B. The seatbase 14 is supported by the diagonal truss 18. To provide a space for a wheelchair 24 or other such article, the seatback 16 is folded over to its folded position 26 flat against the seatbase 14 and the seatbase 14 is raised to its vertically stowed position 28 as FIG. 2 illustrates. To maintain the stowable seat 10 in the raised position 28, the diagonal truss 18 may be locked into position.

To mount the stowable seat 10 to a support member (not illustrated) such as a wall of a vehicle, the wallmount or frame 12 is provided as illustrated in FIG. 1. It is to be understood that a skilled artisan could provide a mirror copy of the stowable seat described herein for mounting to an opposing wall of the vehicle.

Figure 3:
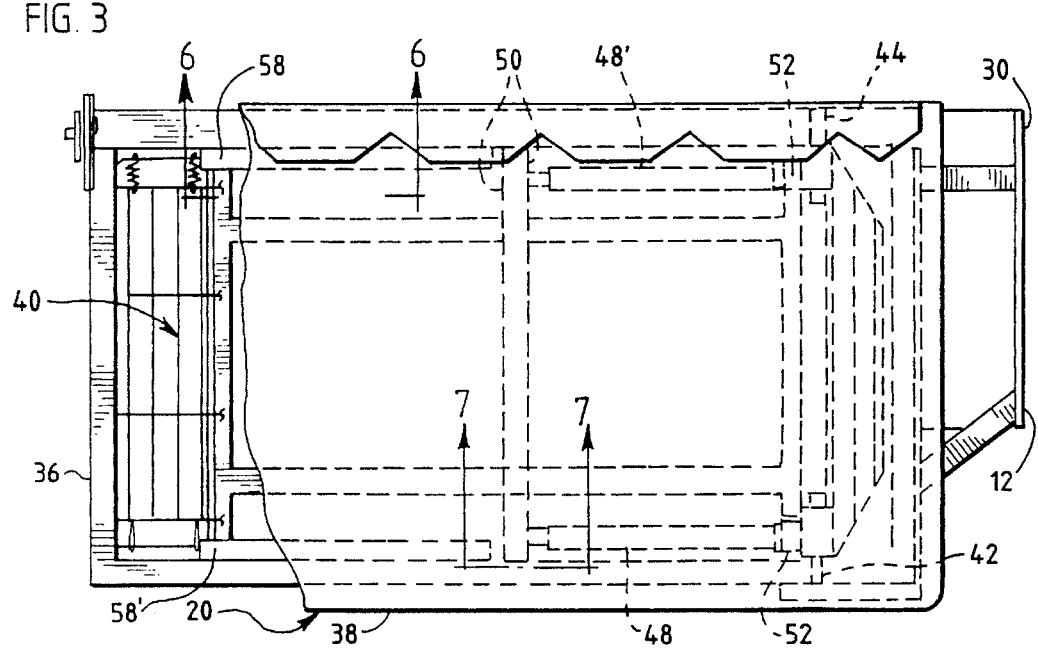
FIG. 3 is a top view, in partial section, illustrating the seatbase in the horizontally deployed position.
Figure 4:
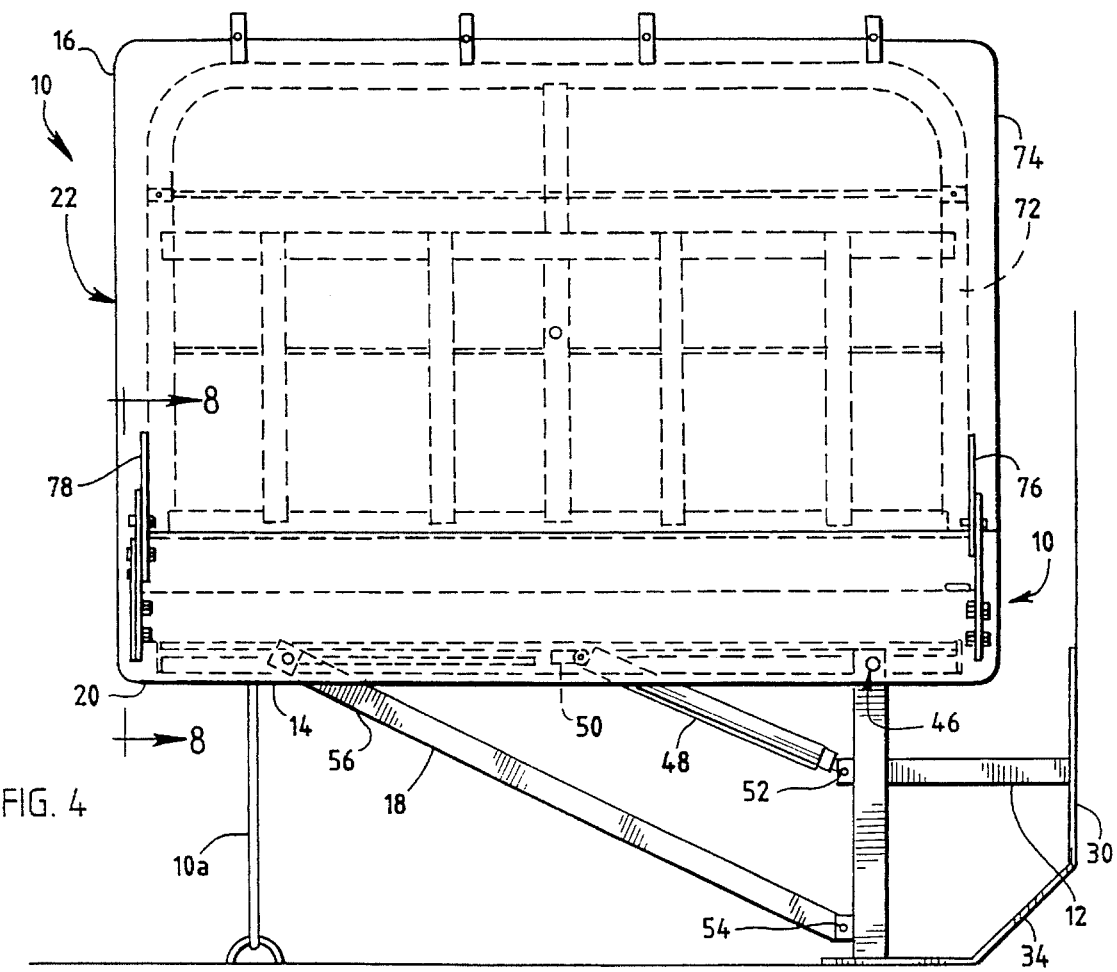
FIG. 4 is a front elevational view of the deployed seat illustrating the seatback in the unfolded position, the seatbase in the horizontally deployed position and a diagonal truss supporting the seatbase.

As FIGS. 4 and 5 illustrate, frame 12 includes a plate 30 preferably constructed of steel. Plate 30 is provided with bolt holes 32 for bolting to the support member (not illustrated). The remainder of the frame 12 is constructed of square tubing attached to the plate 30. To provide heel space near the support member (not illustrated), the plate 30 is offset from the center of the seatbase 14 as illustrated in FIGS. 3 and 5. To accommodate any tubing, piping and electrical conduit located adjacent to the support member (not illustrated), the plate 30 may be provided with an angled portion 34 as illustrated in FIG. 4.

Seatbase 14 is generally rectangular having an inner support frame 36 with a cover 38 attached as FIG. 3 illustrates. Pursuant to typical seat construction practices, the seatbase 14 may be provided with a seat spring 40.

To provide the seatbase 14 with the range of motion extending from a horizontal deployed position 20 to the vertically stowed position 28 as FIGS. 1 and 2 illustrate, the inner seat frame 36 is journaled to the frame or wallmount 12 preferably by bolts 42, 44 as FIG. 3 illustrates. Bolts 42, 44 are aligned on a common axis 46 as illustrated in FIG. 4.

To assist in raising the seatbase 14 to the stowed position 28, a gas charged cylinder 48 is attached thereto to provide a lifting force. It may be desirable to provide an additional gas charged cylinder 48' to provide an evenly distributed lifting force as FIG. 1 illustrates.

To permit the gas charged cylinder 48 to rotate upward in conjunction with the seatbase 14, the gas charged cylinder 48 is rotatably journaled to a cross brace 50 of the inner seat frame 36 as illustrated generally in FIGS. 3 and 4 and more particularly in FIGS. 1 and 7. FIG. 7 illustrates the gas charged cylinder 48 as viewed in the direction 7—7 of FIG. 3. The gas charged cylinder 48 is also rotatably journaled to a pivot point 52 on the frame 12 as FIG. 4 illustrates.

To support the seatbase 14 in its horizontal deployed position 20, the diagonal truss 18 is provided between the frame 12 and the seatbase 14. The diagonal truss 18 may be rectangular as illustrated in FIGS. 1 and 2 to evenly support the seatbase 14 when deployed or may be provided as an elongate rod as generally illustrated in FIG. 4, so long as the seatbase is supported in its horizontally deployed position 20.

The diagonal truss 18 is rotatably journaled to the frame 12 at a pivot point 54. To provide the opposite end 56 of the diagonal truss 18 with translational and rotational motion, the opposite end 56 of the diagonal truss 18 is slidably mounted within a runner track 58 (not illustrated in FIGS. 3 and 4). It is to be understood that a second runner track 58' may be provided depending on the construction of the diagonal truss 18.

As viewed in the direction of reference line 6—6 of FIG. 3, FIG. 6 illustrates the runner track 58 mounted within the seatbase 14. The diagonal truss 18 (not illustrated in FIG. 6) includes a slide member 60 which travels within the runner track 58 to provide translational motion to the diagonal truss 18 and also is configured to permit the diagonal truss 18 to rotate with respect to the runner track 58 as the seatbase 14 is raised.

To maintain the stowable seat 10 in the deployed position 20 as illustrated in FIG. 1, the slide member 60 of the diagonal truss 18 may be constrained within the runner track 58 by an uplock mechanism 62 as illustrated in FIG. 6. To release and permit sliding of the slide member 60 in order to raise the stowable seat 10 from its deployed position 20, the uplock mechanism 62 is provided with a spring-biased release handle 64 which may be forced upward by an operator to pivot and release the uplock mechanism 62.

To maintain the stowable seat 10 in the stowed position 28 as illustrated in FIG. 2, a downlock mechanism 66 also is provided to constrain the slide member 60 of the diagonal truss 18 within the runner track 58 as illustrated in FIG. 6. To release the slide member 60 and permit the stowable seat 10 to be lowered from its stowed position 28, the downlock mechanism 66 is provided with a spring-biased release handle 68 which may be forced upward by an operator to pivot and release the downlock mechanism 66. For clarity, FIGS. 1 and 2 do not illustrate uplock 62 and downlock 66.

To permit adjustment of the horizontal inclination of the seatbase 14, the runner track 58 is provided with an adjustment screw 70 located near the locking mechanism 62. The adjustment screw 70 is rotated to control the depth to which the diagonal truss 18 traverses in the runner track in order to raise or lower the horizontal inclination of the seatbase 14 in its deployed position 20.

As FIG. 4 illustrates, the seatback 16 is essentially constructed of a rectangular inner frame 72 with a cover 74. The specific design of the seatback 16 may vary pursuant to typical seat construction practices well-known in the art.

The seatback 16 attaches to the seatbase 14 by a pivot assembly 76 near the frame end of the stowable seat 10 and by a forward dump mechanism 78 near the free end of the stowable seat 10. FIG. 8 illustrates the forward dump mechanism 78 as viewed in the direction of arrow 8 of FIG. 4.

The forward dump mechanism 78 includes a seatbase side plate 80 attached to the inner seat frame 36 of the seatbase 14. The forward dump mechanism 78 further includes a seatback side plate 82 mounted to the inner frame 72 of the seatback 16. The seatbase and the seatback side plates 80 and 82 may be mounted in position by bolts, welding, or other similar fastening methods.

To permit the seatback 16 to pivot with respect to the seatbase 14, the seatback side plate 82 may be pivotally joined with the seatbase side plate with a pivot pin 84. To lock the seatback 16 into the unfolded position 22, the seatback side plate 82 may be provided with a receiver cutout 86 which receives a sliding lock key 88 and prevents rotation of the seatback side plate 82 with respect to the seatbase side plate 80.

To release the sliding lock key 88 from the receiver cutout 86 and permit rotation of the seatback slide plate 82 with respect to the seatbase side plate 80, the seatbase side plate 80 is provided with a sliding cutout 90 along which the sliding lock key 88 slides. To actuate and release the sliding lock key 88, a release handle 92 is attached to the seatbase side plate 80 by a pivot pin 94 and actuates the sliding lock key 88. A spring 96 is connected to the release handle 92 which maintains the release handle in a locked position 100 and biases the release handle 92 for returning from a released position 102 to the locked position 100.

To lock the seatback 16 in the folded position 26, the seatback slide plate 82 also is provided with a second receiver cutout 104. Cutout 104 permits the seatback 16 to be locked into the folded position 26 upon the return of the release handle 92 from the release position 102 to the lock position 100 and the subsequent receipt of the sliding lock key 88 by the receiver cutout 104. To guide and limit rotation of the seatback side plate 82 with respect to the seatbase side plate 80, a pin and slot structure 105 known in the art is also provided.

FIG. 10 illustrates the pivot assembly 76 in the direction of arrow 10 of FIG. 4. Similar to the forward dump mechanism 78, the pivot assembly 76 includes a seatbase side plate 106 attached to the inner seat frame 36 and a seatback slide plate 108 attached to the inner frame 72. The seatback slide plate 108 is pivotally attached to the seatbase side plate 106 by a pivot pin 110. To readily adapt the stowable seat 10 for use on the opposite side of the vehicle, the pivot assembly 76 is provided with receiver cutouts 86', 104' adapted to receive a lock key 88' if necessary, a sliding cutout and pin and slot structure 105'.

As FIGS. 8 and 9 illustrate, the forward dump mechanism 78 may be provided with a protective cover 112. The pivot assembly 76 of FIG. 10 may similarly be provided with a protective cover (not illustrated). To satisfy industry standards, it may be further desirable to provide the stowable seat 10 with a tether assembly 10a which would attach at one of its ends to the seatbase 14 and at another end to the floor. The tether assembly serves to secure the seatbase 14 to the floor for added safety and would provide for quick disconnection for raising of the seatbase 14. It also may be desirable to provide the stowable seat 10 with optional seat belts, arm rests and grab rails (not illustrated) which are well-known in the art.

In operation, stowable seat 10 is typically maintained in the deployed position 20 as illustrated in FIG. 1. Seatbase 14 is supported by the diagonal truss 18 which has the slide member 60 constrained within the runner track 58 by the uplock mechanism 62 as FIG. 6 illustrates. With the seatback 16 in the unfolded position 22, stowable seat 10 provides seating on a vehicle such as a bus or the like.

It may be desirable, however, to provide space for an individual in a wheel chair or for storing articles on board as FIG. 2 illustrates. To raise the stowable seat 10 to its stowed position 28, seatback 16 is folded into the folded position 26. Release handle 92 of the forward dump mechanism 78 illustrated in FIGS. 8 and 9 is actuated to release the seatback 16 and permit movement into the folded position 26. The release handle 92 of the forward dump mechanism 78 is returned from the release position 102 to the locked position 100 to lock the seatback 16 into the folded position 26.

To raise the seatbase 14 from its horizontally deployed position 20 to the vertically stowed position 28, the release handle 64 of the uplock mechanism 62 illustrated in FIG. 6 is actuated to release the slide member 60 and permit movement of the slide member 60 within the runner track 58. Stowable seat 10 is raised into the stowed position 28 as illustrated in FIG. 2. The gas charged cylinder 48 assists the operator in raising the stowable seat 10.

To prevent the stowable seat 10 from falling from its stowed position 28, the slide member 60 of the diagonal truss 18 is constrained by the downlock mechanism 66 illustrated in FIG. 6. To return the stowable seat 10 from the stowed position 28, the release handle 68 is actuated to release the downlock mechanism 66 and permit the slide member 60 to slide within the runner track 58. As the seatbase 14 returns to the horizontal deployed position 20, the slide member 60 of the diagonal truss 18 is constrained by the uplock mechanism 62. To return the seatback 16 from the folded position 26 to the unfolded position 22, the release handle 92 of the forward dump mechanism 78 illustrated in FIGS. 8 and 9 is actuated to the release position 102 and the seatback 16 is unfolded as FIG. 1 illustrates.

It may thus be seen that the objects of the present inventions set forth herein as well as those made apparent from the foregoing description, are officially obtained. While preferred embodiments of the invention have been set forth for purposes of disclosure, modification of disclosed embodiments of the invention as well as other embodiments thereof may occur to those skilled in the art. Accordingly, the appended claims are intended to cover all embodiments which do not depart from the spirit and scope of the invention.

What we claim is:

1. A stowable seat for mounting to support member of a vehicle wherein a space may be selectively provided for positioning an article adjacent to the stowable seat, when stowed the seat comprising:

a frame attached to a support member;

a cantilevered seatbase having a free end, a pivotable end including a pivot mounted thereto for rotatably associating said pivotable end with said frame and for providing said seatbase with a range of motion extending from a horizontally deployed position to a vertically stowed position, a support member for supporting said seatbase in said deployed position including a moveable end slidably mounted to said seatbase and a fixed end journalled with said frame, and a first lock near said free end for releasably locking said movable end to maintain said seatbase in said deployed position;and a seatback having a pivot for rotatably associating said seatback with said seatbase and for providing said seatback with a range of motion extending from an unfolded position to a folded position, said range of motion of said seatback being perpendicular to said range of motion of said seatbase, said seatback in said unfolded position adapted to be at a predetermined angle with respect to said seatbase in said deployed position to provide seating and said seatback in said folded position adapted to be adjacent said seatbase for stowing to provide the space for the article.

2. The stowable seat as defined in claim 1, wherein said seatbase includes a second lock between said first lock and said pivotable end for releasably locking said movable end within a guide member to retain said seatbase in said stowed position.

3. The stowable seat as defined in claim 1, wherein said seatbase includes a biasing device attached to said seatbase and said frame for providing a lifting force to assist in positioning said seatbase in said stowed position.

4. The stowable seat as defined in claim 3, wherein said biasing device is a pressurized cylinder.

5. The stowable seat as defined in claim 1, wherein said pivot of said seatback includes a dump mechanism for selectively and releasably locking said seatback in either said unfolded position or said folded position.

6. The stowable seat as defined in claim 5, wherein said dump mechanism operably communicates with said seatback and said seatbase and is positioned near said free end of said seatbase.

7. The stowable seat as defined in claim 1, wherein said movable end of said support member is slidably mounted to said seatbase by being slidably received by a longitudinal guide member on an underside of said seatbase.

8. The stowable seat as defined in claim 7, wherein said guide member includes an adjustment member in threading engagement with said guide member near said free end selectively threaded into position for limiting sliding of said movable end toward said free end for adjusting a horizontal elevation of said seatbase in said deployed position.

9. A stowable seat for mounting to a support member of a vehicle wherein a space may be selectively provided for positioning an article adjacent to the stowable seat when stowed, the seat comprising:

a frame attached to a support member;

a cantilevered seatbase having a free end, a pivotable end including a pivot mounted thereto for rotatably associating said pivotable end with said frame and for providing said seatbase with a range of motion extending from a horizontally deployed position to a vertically stowed position, a support member for supporting said seatbase in said deployed position including a movable end slidably mounted to said seatbase and a fixed end journalled with said frame near said frame attached support member, and a first lock near said free end for releasably locking said movable end to maintain said seatbase in said deployed position and a second lock between said first lock and said pivotable end for releasably locking said movable end to maintain said seatbase in said stowed position; and a seatback having a pivot for rotatably associating said seatback with said seatbase and for providing said seatback with a range of motion extending from an unfolded position to a folded position, said range of motion of said seatback being perpendicular to said range of motion of said seatbase, said pivot including a lock for selectively and releasably locking said seatback in said unfolded position or said folded position, said seatback in said unfolded position adapted to be at a predetermined angle with respect to said deployed position of said seatbase to provide seating and said seatback in said folded position adapted to be flat against said seatbase for stowing to provide the space for the article.

10. The stowable seat as defined in claim 9, wherein said movable end of said support member is slidably mounted to said seatbase by being slidably received by a longitudinal guide member on an underside of said seatbase.

11. The stowable seat as defined in claim 10, wherein said guide member includes an adjustment member in threading engagement with said guide member near said free end selectively threaded into position for limiting sliding of said movable end toward said free end for adjusting a horizontal elevation of said seatbase in said deployed position.

12. The stowable seat as defined in claim 9, wherein said seatbase includes a biasing device attached between said seatbase and said frame for providing a lifting force to assist in positioning said seatbase in said stowed position.

13. The stowable seat as defined in claim 12, wherein said biasing device is a pressurized cylinder.

14. The stowable seat as defined in claim 9, wherein said pivot of said seatback includes a dump mechanism for selectively and releasably locking said seatback in either said unfolded position or said folded position.

15. The stowable seat as defined in claim 14, wherein said dump mechanism operably communicates with said seatback and said seatbase and is positioned near said free end of said seatbase.

16. A stowable seat for mounting to a support member of a vehicle wherein a space may be selectively provided for selectively positioning a wheelchair or other article adjacent to the stowable seat when stowed, the seat comprising:

a frame attached to a support member;

a cantilevered seatbase having a free end, a pivotable end journalled with said frame near said support member for providing said seatbase with a range of motion extending from a horizontally deployed position to a vertically stowed position, a diagonal support member for supporting said seatbase in said deployed position including a movable end slidably received by a longitudinal guide member affixed to an underside of said seatbase and a fixed end journalled with said frame near said support member, and a first lock near said free end for releasably locking said movable end within said guide member to support said seatbase in said deployed position and a second lock between said first lock and said pivotable end for releasably locking said movable end within said guide member to retain said seatbase in said stowed position, said seatbase having a pressurized biasing means attached between said seatbase and said frame for providing a lifting force to assist in positioning said seatbase in said stowed position; and a seatback having a pivot for rotatably associating said seatback with said seatbase and for providing said seatback with a range of motion extending from an unfolded position to a folded position, said range of motion of said seatback perpendicular to said range of motion of said seatbase, said pivot including a dump mechanism selectively actuated for selectively and releasably locking said seatback in either said unfolded position or said folded position, said seatback in said unfolded position adapted to be at a predetermined angle with respect to said seatbase in said deployed position to provide seating and said seatback in said folded position adapted to be flat against said seatbase for stowing to provide the space for the wheelchair or other article.

17. The stowable seat as defined in claim 16, wherein said guide member includes an adjustment member in threading engagement with said guide member near said free end selectively threaded into position for limiting sliding of said movable end toward said free end for adjusting a horizontal elevation of said seatbase in said deployed position.

18. The stowable seat as defined in claim 16, wherein a tether may be removably secured between said seatbase in said deployed position and a floor of the vehicle for downwardly securing said seatbase to maintain said seatbase in said deployed position.

19. The stowable seat as defined in claim 16, wherein said dump mechanism operably communicates with said seatback and said seatbase and is positioned near said free end of said seatbase.

* * * * *